(12) United States Patent
Hazlewood et al.

(10) Patent No.: US 9,378,388 B2
(45) Date of Patent: Jun. 28, 2016

(54) MANAGING KEYS USED FOR ENCRYPTING DATA

(75) Inventors: Kristin M. Hazlewood, Austin, TX (US); John T. Peck, Liberty Hill, TX (US); Krishna K. Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1502 days.

(21) Appl. No.: 12/763,811

(22) Filed: Apr. 20, 2010

(65) Prior Publication Data

US 2011/0258458 A1 Oct. 20, 2011

(51) Int. Cl.
*H04L 9/08* (2006.01)
*H04L 9/16* (2006.01)
*H04L 29/06* (2006.01)
*G06F 21/62* (2013.01)

(52) U.S. Cl.
CPC .............. *G06F 21/6218* (2013.01); *H04L 9/08* (2013.01); *H04L 9/16* (2013.01); *G06F 2221/2151* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 6,134,660 A | 10/2000 | Boneh et al. | |
| 6,839,437 B1 | 1/2005 | Crane et al. | |
| 6,934,840 B2 | 8/2005 | Rich et al. | |
| 7,330,982 B1 | 2/2008 | Mehr | |
| 7,549,174 B1 | 6/2009 | Falkner et al. | |
| 7,890,764 B2 * | 2/2011 | Tanaka | 713/178 |
| 8,135,951 B2 * | 3/2012 | Adams et al. | 713/158 |
| 8,139,770 B2 * | 3/2012 | Zheng et al. | 380/286 |
| 2002/0138434 A1 | 9/2002 | Leung et al. | |
| 2007/0230704 A1 * | 10/2007 | Youn et al. | 380/277 |
| 2008/0219453 A1 | 9/2008 | Chang et al. | |
| 2008/0294906 A1 | 11/2008 | Chang et al. | |
| 2009/0003609 A1 | 1/2009 | Chang et al. | |
| 2009/0110198 A1 | 4/2009 | Garimella et al. | |
| 2009/0208003 A1 * | 8/2009 | Matsukawa et al. | 380/44 |
| 2009/0254750 A1 | 10/2009 | Bono et al. | |
| 2009/0316897 A1 * | 12/2009 | Kambayashi et al. | 380/255 |
| 2011/0107301 A1 * | 5/2011 | Chan et al. | 717/121 |

OTHER PUBLICATIONS

USPTO Final Office Action, U.S. Appl. No. 13/424,428, Apr. 24, 2013, 15 pages.
USPTO Office Action, U.S. Appl. No. 13/424,428, Jan. 11, 2013, 11 pages.

* cited by examiner

*Primary Examiner* — Dede Zecher
*Assistant Examiner* — Jason C Chiang
(74) *Attorney, Agent, or Firm* — Yee & Associates, P.C.; Gail H. Zarick (57) ABSTRACT

A method, a data processing system, and a computer program product for managing cryptographic information. A determination is made as to whether a first time stamp of when cryptographic information was created is more recent than a second time stamp of a backup of the cryptographic information in response to receiving a request for the cryptographic information from a requester. The cryptographic information is used to encrypt data. The cryptographic information is prevented from being provided to the requester in response to a determination that the first time stamp of cryptographic information creation is more recent than the second time stamp of the backup of the cryptographic information.

15 Claims, 4 Drawing Sheets

MANAGING KEYS USED FOR ENCRYPTING DATA

BACKGROUND

1. Field

The disclosure relates generally to data processing systems and, more specifically, to a method and apparatus for managing cryptographic information. Still more specifically, the present disclosure relates to a method and apparatus for determining when to provide a key for use in encrypting data in response to a request for a key.

2. Description of the Related Art

Many organizations store large amounts of data. For example, banks, hospitals, brokerage companies, consulting companies, and other organizations store data for providing goods and services. Often times, the data includes confidential information. For example, an on-line store may store information about customers including telephone numbers, addresses, a list of transactions performed, credit card information, and/or other confidential information. As another example, a software company may have different versions of software being produced on its network. The software is often considered a trade secret during development.

Access to this type of information is often restricted. For example, a user wishing to access the information is required to present credentials. These credentials may be, for example, a user identifier and a password. In other cases, other types of credentials, such as biometrics, also may be used to control access to the data.

Another mechanism used to protect this data is encryption. Processes perform encryption to make the data unusable by anyone who does not have a key or other encryption information needed to decrypt the data. This type of mechanism may be used in addition to the presentation of credentials to provide additional security for data. Many organizations encrypt their data for security.

For example, a financial institution, such as a bank, performs many transactions every day. These transactions involve information, such as customer names, addresses, deposits, withdrawals, and other information. Banks may protect this information by encrypting the information. A key is used with an encryption process to encrypt the data for the financial transactions. As a result, this data cannot be viewed without the key, increasing the security and confidentiality of the information. As another example, email servers may exchange certificates containing keys. These certificates are used to encrypt messages that may be sent between two email servers. Anyone obtaining or intercepting the messages cannot view the information without the proper certificate.

SUMMARY

The different illustrative embodiments provide a method, a data processing system, and a computer program product for managing cryptographic information. A determination is made as to whether a first time stamp of when cryptographic information was created is more recent than a second time stamp of a backup of the cryptographic information in response to receiving a request for the cryptographic information from a requester. The cryptographic information is used to encrypt data. The cryptographic information is prevented from being provided to the requester in response to a determination that the first time stamp of cryptographic information creation is more recent than the second time stamp of the backup of the cryptographic information.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the data processing system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
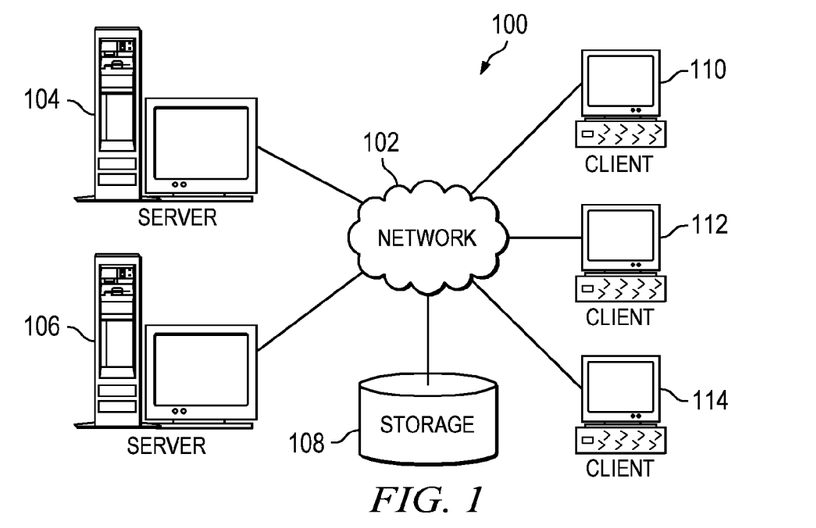
FIG. 1 is an illustrative diagram of a data processing environment in which illustrative embodiments may be implemented.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. For example, server computer 104 may include a key server. The key server may provide keys to client computers 110, 112, and 114. These client computers may request the keys to encrypt data.

Network data processing system 100 may include additional server computers, client computers, and other devices not shown. One or more illustrative embodiments may be implemented in network data processing system 100 to manage cryptographic information. In the illustrative examples, cryptographic information is any information that may be used to encrypt data, decrypt data, or encrypt and decrypt data.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
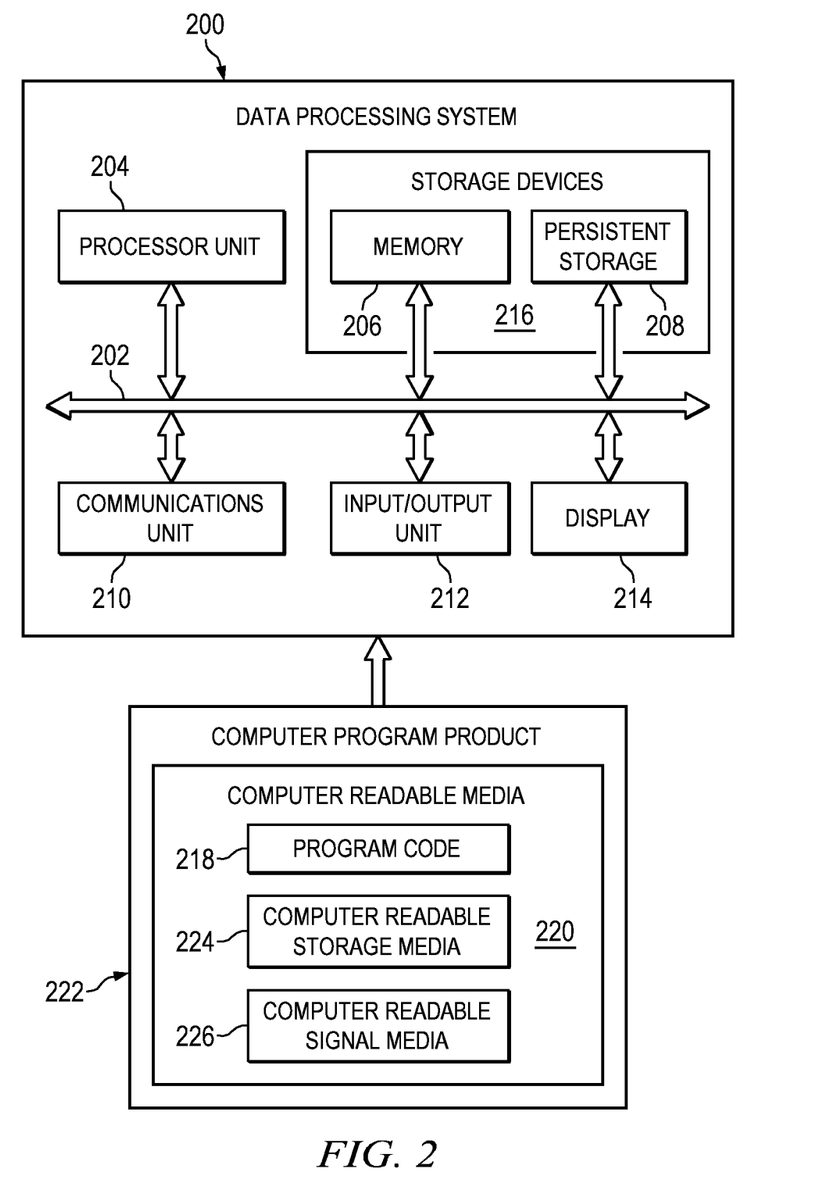
FIG. 2 is an illustration of a data processing system in accordance with an illustrative embodiment.

Turning now to FIG. 2, an illustration of a data processing system is depicted in accordance with an illustrative embodiment. Data processing system 200 is an example of hardware that may be used to implement computers in network data processing system 100 in FIG. 1. For example, data processing system 200 may be used to implement server computers and client computers in network data processing system 100 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

The different illustrative embodiments recognize and take into account a number of different considerations. For example, the different illustrative embodiments recognize and take into account that encryption information used to encrypt data may be generated at various times. For example, encryption information may include at least one of a key and a certificate. The key is information needed by a process to transform the data from an unencrypted state to an encrypted state. The process is often called a cipher, and the information is often referred to as a key.

The different illustrative embodiments recognize and take into account that it is important to avoid losing cryptographic information. For example, if a key is used with an encryption process to encrypt data and the key is lost, the encrypted data can no longer be used. As a result, the encrypted data is no longer usable. Further, the different illustrative embodiments recognize and take into account that backing up cryptographic information is important in case the cryptographic information is lost or damaged, such that it cannot be used to decrypt the encrypted data.

The illustrative embodiments recognize and take into account that cryptographic information may be lost through various events. These events may include, for example, without limitation, accidental deletion of the cryptographic information, a corruption of the cryptographic information, a loss of the media on which the cryptographic information is stored, and other events.

If a backup of the cryptographic information, such as keys, is not present, the loss of even one key may be detrimental to an organization. For example, the transactions of a branch of a bank may be encrypted daily when the transactions are stored. The loss of a key may result in an inability to access any of the transactions that occurred for the particular branch. These transactions may run in the tens of thousands or hundreds of thousands of transactions.

In some cases, backups of the transactions may be present. If, however, these backups are also encrypted using the same key, the backup of the transactions cannot be used. In some cases, the transactions may be recreated. For example, the transactions may be recreated by going through paper copies of the transactions. This process, however, is time consuming and expensive. If paper copies are unavailable, the transactions may never be recreated.

Thus, the illustrative embodiments recognize and take into account that it is important to backup cryptographic information used to encrypt data. Additionally, the illustrative embodiments recognize and take into account that the cryptographic information should be backed up before being used to encrypt data.

The different illustrative embodiments recognize that a number of different mechanisms may be used to avoid this situation. For example, a process may be used to automatically backup a key each time the key is created. As a result, at least two copies of the key are present in case one is lost or becomes unusable. The different illustrative embodiments recognize and take into account that this type of process adds complexity to the backup and key generation system.

Thus, the illustrative embodiments provide a method, data processing system, and computer program product for managing cryptographic information. In response to receiving a request for cryptographic information from a requester at a processor unit, a determination is made by the processor unit as to whether a first time stamp of cryptographic information creation is more recent than a second time stamp of a backup of the cryptographic information. In response to a determination that the first time stamp of cryptographic information creation is more recent than the second time stamp of the backup of the cryptographic information, the processor unit prevents the cryptographic information from being provided to the requester. In these examples, the first time stamp of cryptographic information creation is more recent than a second time stamp when a backup is not present.

Figure 3:
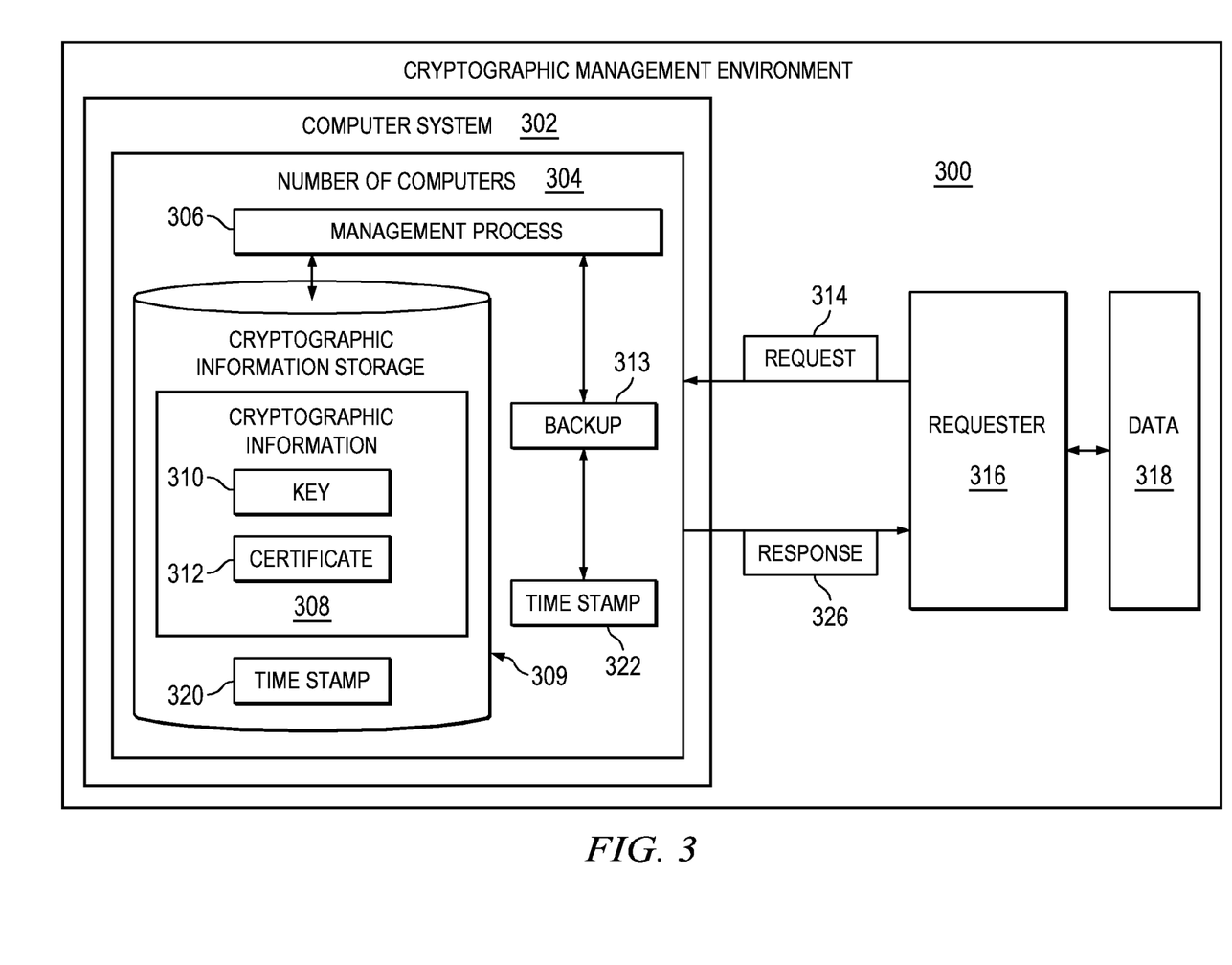
FIG. 3 is an illustration of a cryptographic management environment in accordance with an illustrative embodiment.

With reference now to FIG. 3, an illustration of a cryptographic management environment is depicted in accordance with an illustrative embodiment. Network data processing system 100 in FIG. 1 is an example of an implementation for cryptographic management environment 300 in FIG. 3. In these illustrative examples, cryptographic management environment 300 includes computer system 302. Computer system 302 comprises number of computers 304. Number of computers 304 is one or more computers in these examples. Number of computers 304 may have an architecture, such as that illustrated for network data processing system 100 in FIG. 1. In other illustrative examples, number of computers 304 may be a single computer implemented using data processing system 200 in FIG. 2.

In these illustrative examples, management process 306 runs on computer system 302. Management process 306 may also be referred to as an encryption management process. Management process 306 manages cryptographic information 308 in cryptographic information storage 309. In these illustrative examples, cryptographic information 308 is any information that may be used to encrypt and/or decrypt data. Cryptographic information 308 may be one or more pieces of cryptographic information stored within cryptographic information storage 309. In these examples, cryptographic information 308 may be at least one of key 310, certificate 312, and other suitable cryptographic information.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

Management process 306 may create keys, such as key 310, in cryptographic information 308. Additionally, management process 306 creates backup 313 of cryptographic information 308. Backup 313 may include one or more keys, certificates, and other forms of cryptographic information 308. Management process 306 also handles requests for cryptographic information 308.

For example, in response to receiving request 314 from requester 316 for cryptographic information 308, management process 306 processes request 314. In these illustrative examples, requester 316 may take a number of different forms. Requester 316, in these examples, is any software or hardware component that uses cryptographic information to encrypt and/or decrypt data 318. For example, requester 316 may be a hard disk drive, a tape drive, a server process on a computer, a software application, an email server, a database system, and other suitable types of requesters.

In these illustrative examples, management process 306 determines whether to send cryptographic information 308 to requester 316. In these illustrative examples, management process 306 first determines whether backup 313 of cryptographic information 308 is present. If backup 313 for cryptographic information 308 is not present, cryptographic information 308 is not provided to requester 316.

If backup 313 for cryptographic information 308 is present, management process 306 then performs additional processing to determine whether to send cryptographic information 308 to requester 316. In these illustrative examples, this determination is made using time stamps associated with cryptographic information 308 and backup 313.

In the depicted examples, time stamp 320 is associated with cryptographic information 308. Time stamp 320 identifies the time when cryptographic information 308 was generated and is, in these examples, a time stamp of cryptographic information creation. In this example, time stamp 320 is stored with cryptographic information 308 in cryptographic information storage 309. In other examples, time stamp 320 may be included within cryptographic information 308. Additionally, time stamp 322 is associated with backup 313 of cryptographic information 308. Time stamp 322 identifies the time at which backup 313 was performed. In these examples, time stamp 322 may indicate the time at which backup 313 was started, completed, or a combination of the two.

Time stamp 320 is compared to time stamp 322 to form a comparison. A determination is made from the comparison as to whether to prevent the sending of cryptographic information 308 to requester 316.

In this illustrative example, if time stamp 320 for cryptographic information 308 is more recent than time stamp 322 for backup 313, management process 306 prevents the sending of cryptographic information 308 to requester 316. If time stamp 320 for cryptographic information 308 is not more recent than time stamp 322 for backup 313, management process 306 sends cryptographic information 308 to requester 316 in the form of response 326.

In these illustrative examples, time stamp 320 and time stamp 322 will not be the same time. When backup 313 of cryptographic information 308 is made, creation of cryptographic information 308 is prevented during that period of time. In response to an absence of a determination that time stamp 320 for cryptographic information 308 is more recent than time stamp 322 for backup 313 of cryptographic information 308, cryptographic information 308 is sent to requester 316 in response 326.

In this manner, requester 316 can be prevented from encrypting data 318 when cryptographic information 308 is not received. As a result, if cryptographic information 308 is lost by requester 316 after encryption of data 318, backup 313 of cryptographic information 308 exists. Backup 313 of cryptographic information 308 may be used to decrypt data 318.

In these examples, management process 306 also may create cryptographic information 308 and perform backups of cryptographic information 308. As a result, the different illustrative embodiments refuse to serve or send cryptographic information 308 until a backup of cryptographic information 308 occurs. No timing between the backups and when cryptographic information 308 is sent is needed in the different illustrative embodiments.

The illustration of cryptographic management environment 300 in FIG. 3 is not meant to imply physical or architectural limitations to the manner in which different illustrative embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, management process 306 may be integrated with other processes. For example, management process 306 may be part of an application, such as an accounting application or a financial transaction application. In other illustrative embodiments, management process 306 may be part of a server process. For example, management process 306 may be implemented as part of a key server process used to provide keys to different clients. In another illustrative example, request 314 for cryptographic information 308 may be for a single key, a certificate, a key and a certificate, multiple keys, or other forms of cryptographic information 308.

Figure 4:
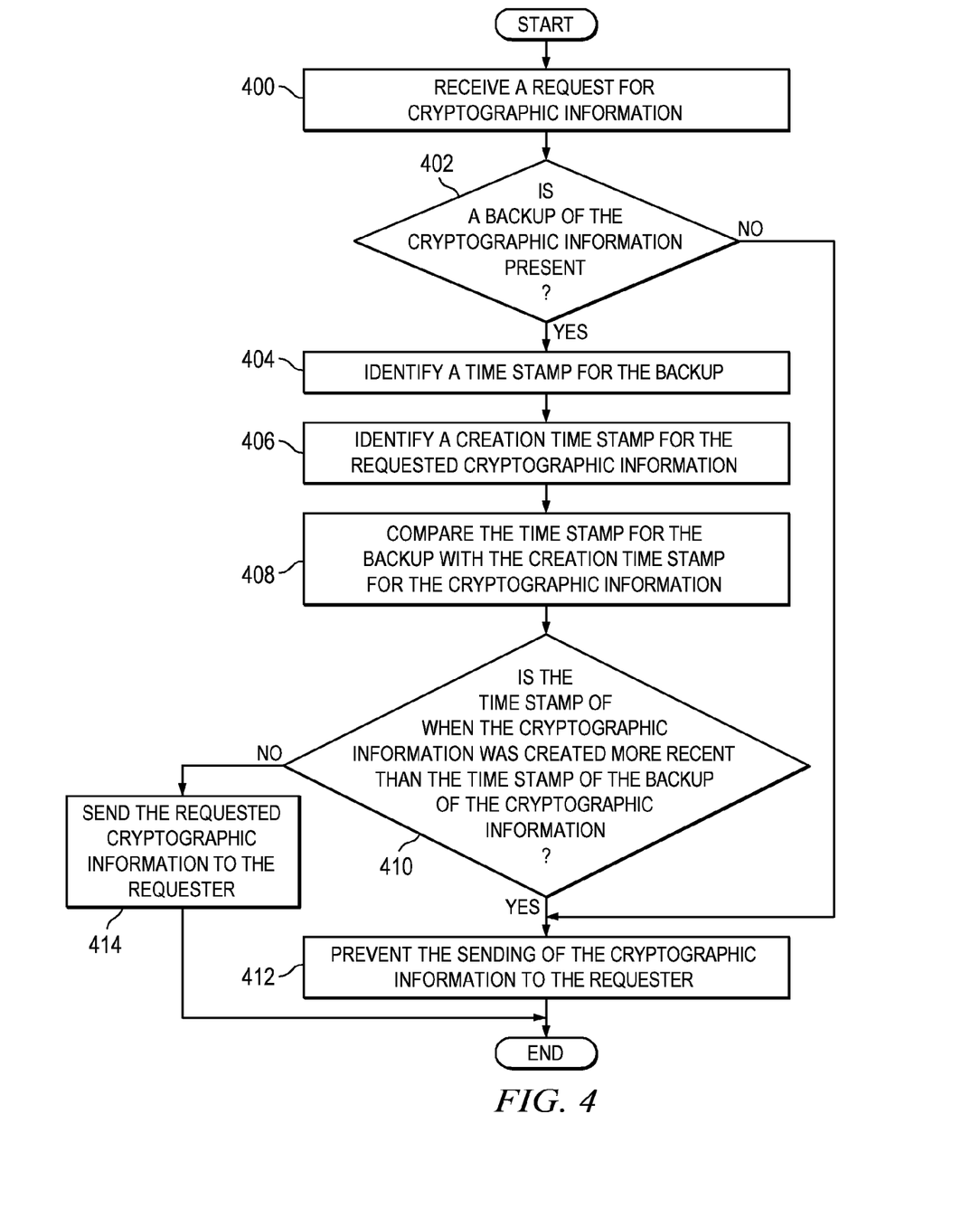
FIG. 4 is an illustration of a flowchart of a process for managing cryptographic information in accordance with an illustrative embodiment.

With reference now to FIG. 4, an illustration of a flowchart of a process for managing cryptographic information is depicted in accordance with an illustrative embodiment. The process illustrated in FIG. 4 may be implemented in cryptographic management environment 300 in FIG. 3. In these illustrative examples, this process may be implemented as program code that is run for management process 306 in FIG. 3. This process may be used with a process that backs up cryptographic information. The process in FIG. 4 prevents the sending of cryptographic information to requestors until a backup of the cryptographic information has been made.

The process begins by receiving a request for cryptographic information (step 400). In this example, the request for cryptographic information may take a number of different forms. The request may be for a key, a certificate, a key and a certificate, multiple keys, or some other form of cryptographic information.

In response to receiving the request, a determination is made as to whether a backup of the cryptographic information is present (step 402). If a backup is present, the process identifies a time stamp for the backup (step 404). The process also identifies a creation time stamp for the requested cryptographic information (step 406).

Thereafter, the process compares the time stamp for the backup with the creation time stamp for the cryptographic information (step 408). Next, a determination is made as to whether the time stamp of when the cryptographic information was created is more recent than the time stamp of the backup of the cryptographic information (step 410). This step may be made using the comparison from step 408.

If the time stamp of when the cryptographic information was created is more recent than the time stamp of the backup of the cryptographic information, the process prevents the sending of the cryptographic information to the requester (step 412), with the process terminating thereafter. Step 412 may merely involve ceasing further processing of the request. In other illustrative examples, step 412 may include sending an error message back to the requester.

With reference again to step 410, if the time stamp of when the cryptographic information was created is not more recent than the time stamp of the backup, the requested cryptographic information is sent to the requester (step 414), with the process terminating thereafter.

With reference again to step 402, if a backup is not present, the process proceeds to step 412, as described above.

Figure 5:
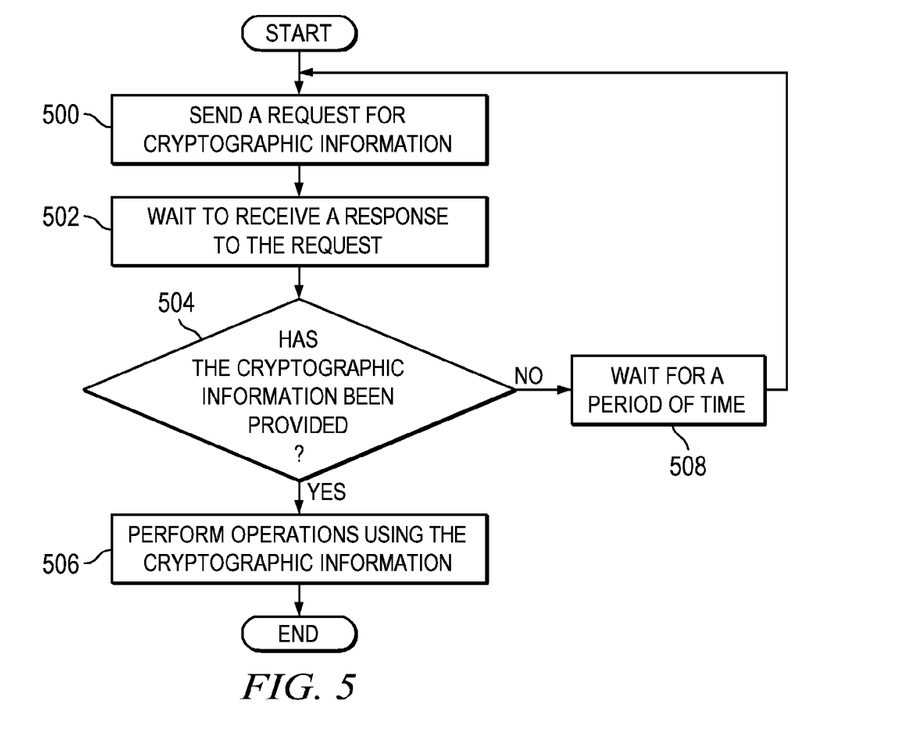
FIG. 5 is an illustration of a flowchart of a process for requesting cryptographic information in accordance with an illustrative embodiment.

With reference now to FIG. 5, an illustration of a flowchart of a process for requesting cryptographic information is depicted in accordance with an illustrative embodiment. The process illustrated in FIG. 5 may be implemented as program code that is run for processes in requester 316 in FIG. 3.

The process begins by sending a request for cryptographic information (step 500). This request is sent to a process, such as management process 306 in FIG. 3. The process may be part of a key server or other cryptographic information management server.

Thereafter, the process waits to receive a response to the request (step 502). When a response is received, a determination is made as to whether the cryptographic information has been provided (step 504). If the cryptographic information is provided, the process performs operations using the cryptographic information (step 506), with the process terminating thereafter.

With reference again to step 504, if the cryptographic information has not been provided, the process waits for a period of time (step 508). Thereafter, the process returns to step 500 to send another request for the cryptographic information.

The process in FIG. 5 takes into account that the requested cryptographic information may not be provided if the time stamp of when the cryptographic information was created is more recent than the time stamp of the backup. As a result, the process waits for a period of time to re-request the cryptographic information. The subsequent request may occur at a time when a backup of the cryptographic information has been made. In this situation, the time stamp of the cryptographic information would not be more recent than the time stamp of the backup. When the cryptographic information is received, encryption of data can be performed with the knowledge that a backup of the cryptographic information is present. As a result, a loss or corruption of the cryptographic information by the requester does not make the encrypted data unusable because a backup of the cryptographic information is present.

Thus, the different illustrative embodiments provide a method and apparatus for managing cryptographic information. With the different illustrative examples, a failsafe or preventative process is present to avoid issues that may occur when cryptographic information, such as a key, is lost or becomes unusable. The different illustrative embodiments reduce the complexity that may be associated with performing an automatic backup every time cryptographic information is generated. For example, no timing between when cryptographic information is sent in response to requests and when backups occur is needed. Of course, the process in the different illustrative embodiments may be used with a process that times backups with when cryptographic information can be sent in response to requests. With this type of implementation, the illustrative embodiments can ensure that a back has occurred before cryptographic information is sent.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any data processing system. For the purposes of this description, a computer-usable or computer readable medium can be any tangible apparatus that can contain, store, communicate, propagate, or transport the program for use by or in connection with the data processing system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running of the program code.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
    a bus;
    a storage device connected to the bus, wherein the storage device contains program code; and
    a processor unit connected to the bus, wherein the processor unit is configured to run the program code to determine whether a backup of cryptographic information is present in response to receiving a request for the cryptographic information from a requester; to determine whether a first time stamp of when the cryptographic information was created is more recent than a second time stamp of the backup of the cryptographic information in response to determining that the backup of the cryptographic information is present, wherein the cryptographic information is used to encrypt data; and prevent the cryptographic information from being provided to the requester in response to a determination that the first time stamp of cryptographic information creation is more recent than the second time stamp of the backup of the cryptographic information.

2. The data processing system of claim 1, wherein the processor unit is further configured to run the program code to send the cryptographic information to the requester in response to an absence of the determination that the first time stamp of the cryptographic information creation is more recent than the second time stamp of the backup of the cryptographic information.

3. The data processing system of claim 1, wherein the processor unit is further configured to run the program code to send an error message to the requester in response to the determination that the first time stamp of the cryptographic information creation is more recent than the second time stamp of the backup of the cryptographic information.

4. The data processing system of claim 1, wherein in being configured to run the program code to determine whether the first time stamp of the cryptographic information creation is more recent than the second time stamp of the backup of the cryptographic information in response to determining that the backup of the cryptographic information is present, the processor unit is configured to determine whether the first time stamp of the cryptographic information creation is more recent than the second time stamp of the backup of the cryptographic information in response to receiving the request for the cryptographic information from the requester and the backup of the cryptographic information being present.

5. The data processing system of claim 1, wherein the requester is selected from one of a hard disk drive, a tape drive, a server process on a computer, a software application, an email server, and a database system.

6. The data processing system of claim 1, wherein the cryptographic information is selected from one of a key and a certificate.

7. The data processing system of claim 1, wherein the requester is prevented from encrypting the data without the cryptographic information.

8. A computer program product for managing cryptographic information, the computer program product comprising:
a tangible computer readable storage device; and
program code, stored on the tangible computer readable storage device, for determining whether a backup of cryptographic information is present in response to receiving a request for the cryptographic information from a requester;
program code, stored on the tangible computer readable storage device, for determining whether a first time stamp of when the cryptographic information was created is more recent than a second time stamp of the backup of the cryptographic information in response to determining that the backup of the cryptographic information is present, wherein the cryptographic information is used to encrypt data; and
program code, stored on the tangible computer readable storage device, for preventing the cryptographic information from being provided to the requester in response to a determination that the first time stamp of cryptographic information creation is more recent than the second time stamp of the backup of the cryptographic information.

9. The computer program product of claim 8 further comprising:
program code, stored on the tangible computer readable storage device, for sending the cryptographic information to the requester in response to an absence of the determination that the first time stamp of the cryptographic information creation is more recent than the second time stamp of the backup of the cryptographic information.

10. The computer program product of claim 8 further comprising:
program code, stored on the tangible computer readable storage device, for sending an error message to the requester in response to the determination that the first time stamp of the cryptographic information creation is more recent than the second time stamp of the backup of the cryptographic information.

11. The computer program product of claim 8 wherein the program code, stored on the tangible computer readable storage device, for determining whether the first time stamp of the cryptographic information creation is more recent than the second time stamp of the backup of the cryptographic information in response to determining that the backup of the cryptographic information is present, comprises:
program code, stored on the tangible computer readable storage device, for determining whether the first time stamp of the cryptographic information creation is more recent than the second time stamp of the backup of the cryptographic information in response to receiving the request for the cryptographic information from the requester and the backup of the cryptographic information being present.

12. The computer program product of claim 8, wherein the requester is selected from one of a hard disk drive, a tape drive, a server process on a computer, a software application, an email server, and a database system.

13. The computer program product of claim 8, wherein the cryptographic information is selected from one of a key and a certificate.

14. The computer program product of claim 8, wherein the requester is prevented from encrypting the data without the cryptographic information.

15. The computer program product of claim 8, wherein the program code, stored on the tangible computer readable storage device, for determining whether the first time stamp of the cryptographic information creation is more recent than the second time stamp of the backup of the cryptographic information in response to determining that the backup of the cryptographic information is present; and the program code, stored on the computer readable storage device, for preventing the cryptographic information from being provided to the requester in response to the determination that the first time stamp of the cryptographic information creation is more recent than the second time stamp of the backup of the cryptographic information are for an encryption management process.

* * * * *